United States Patent [19]

Vandling

[11] 4,228,466
[45] Oct. 14, 1980

[54] TRANSMISSION MODE SIGNALING BETWEEN A FACSIMILE TRANSMITTER AND A FACSIMILE RECEIVER

[75] Inventor: John M. Vandling, Pleasantville, N.Y.

[73] Assignee: Exxon Research & Engineering Co., Florham Park, N.J.

[21] Appl. No.: 886,147

[22] Filed: Mar. 13, 1978

Related U.S. Application Data

[63] Continuation-in-part of Ser. No. 617,104, Sep. 26, 1975, Pat. No. 4,079,425.

[51] Int. Cl.$^2$ ............................................. H04N 1/36
[52] U.S. Cl. .................................. 358/257; 358/288; 358/267
[58] Field of Search ............... 358/260, 265, 266, 267, 358/275, 281, 288, 257, 285–287, 293, 289, 264

[56] References Cited

U.S. PATENT DOCUMENTS

| | | | |
|---|---|---|---|
| 3,889,057 | 6/1975 | Perreault et al. | 358/267 |
| 3,955,045 | 5/1976 | Ford | 358/288 |
| 4,000,371 | 12/1976 | Ogawa | 358/257 |

Primary Examiner—John C. Martin
Attorney, Agent, or Firm—N. L. Norris

[57] ABSTRACT

A facsimile transmitter comprises a rotatable drum and a sensor for detecting dark-light variations in a document mounted on the drum. A facsimile receiver comprises a rotatable drum and a writing stylus for reproducing dark-light variations on a copy medium mounted on the drum. Prior to transmission of modulated signals representing the dark-light variations in the document, synchronizing signals are transmitted from the transmitter to the receiver. The synchronizing signals comprise pulses of selected and controlled frequency duration and time lapse therebetween to signal the transmission mode. The various modes signaled include different and variable scanning rates, different frequency bandwidths and different forms of modulation.

37 Claims, 11 Drawing Figures

TRANSMISSION MODE SIGNALING BETWEEN A FACSIMILE TRANSMITTER AND A FACSIMILE RECEIVER

RELATED INVENTIONS

This application is a continuation-in-part of copending application Ser. No. 617,104 filed Sept. 26, 1975, now U.S. Pat. No. 4,079,425.

BACKGROUND OF THE INVENTION

This invention relates to facsimile systems comprising a transmitter, a receiver and a communications network or link therebetween. More particularly, this invention relates to a system wherein a document is scanned at a facsimile transmitter to generate electrical information-bearing signals representing the dark-light variations in the document being scanned. These information-bearing signals are then transmitted over the communications network to a facsimile receiver where the information-bearing signals are converted to marks or images on a copy medium so as to form a copy which is a reasonable facsimile of the original document.

Presently available facsimile transmitters and receivers are capable of different transmission modes. For example, the facsimile transmitters and receivers are capable of operating at different scanning rates depending upon the particular resolution required in a transmission so as to achieve different transmission times or durations. The QWIP 1000 facsimile transceiver manufactured by QWIP Systems Division of Exxon Enterprises is capable of different scanning rates to achieve a 4-minute transmission mode as well as a 6-minute transmission mode. These different scanning rates are achieved in the QWIP 1000 facsimile transceiver which comprises a rotatable drum for achieving the scanning motion by maintaining a constant drum speed in both the 4-minute mode as well as the 6-minute mode while varying the rate at which the reading or writing head moves along a direction parallel with the axis of the drum.

Typically, the operator of a facsimile transmitter such as the QWIP 1000 is able to advise the operator of a facsimile receiver of the particular choice of a transmission mode. In other words, the facsimile transmitter operator can examine the document to be transmitted and determine the resolution required while also considering the cost involved in utilizing the transmission channel for a transmission of six minutes versus four minutes. It is, however, desirable in some instances to provide for automatic signaling of the particular transmission mode so as to permit the receiver to automatically respond to and prepare for the transmission without intervention by the operator.

In order to provide for transmission mode signaling, the model 410 transceiver manufactured by the Xerox Corporation frequency modulates the synchronizing signal which is coincident with the juxtaposition between the photodetector and the clamp of a rotating drum on the transceiver. More particularly, a signal is transmitted from a transmitter having a frequency of 1500 Hz. during the synchronizing pulse for a 6-minute transmission mode and a signal of 1250 Hz. is generated during the synchronizing pulse for a 4-minute transmission mode. Since the Xerox 410 provides for a 15 second synchronizing period at the beginning of a transmission mode, it is possible for a receiver to detect the frequency of the synchronizing pulse and select the appropriate scanning rate in a direction parallel to the axis of the 410 drum before the document transmission begins. Typically, the duration of the synchronizing pulse is constant and the occurrence of the pulse relative to the rotation of the drum clamp past the document photodetector is a function of the tolerance on a pulse generator associated with the rotatable drum.

In addition to providing different scanning rate transmission modes, e.g., 4 or 6-minute transmission modes, it is desirable to provide for the selection of other transmission modes.

SUMMARY OF THE INVENTION

It is an object of this invention to provide new and improved facsimile mode signaling.

It is a further object of this invention to provide new and improved facsimile mode signaling capable of signaling a large number of modes.

It is a still further object of this invention to provide new and improved facsimile mode signaling which is compatible with the mode signaling presently being practiced.

In accordance with these and other objects of the invention, a preferred embodiment of the invention comprises a facsimile transmitting unit for transmitting signals representing dark-light variations in a document to a remote location. Sensor means sense dark-light variations in a document and scanning means scan the sensor means relative to the document. Sync generator means coupled to the scanning means generates synchronizing signals comprising a series of pulses representing the predetermined relative position between the scanning means and the sensor means. Modulator means coupled to the sensor means and the sync generator means generate modulated transmission signals representing dark-light variations in the document and the synchronizing signals. Mode signaling means associated with the sync generator means selects and controls the time lapse between pulses of the synchronizing signals in response to the selection of the transmission mode during an initial synchronizing period prior to transmission of signals representing dark-light variations.

In accordance with one aspect of the invention, the selection and control of the time lapse may signal the scanning rate characteristic of the selected mode. In the preferred embodiment of the invention, the scanning means may scan the sensor means relative to the document in two substantially orthogonal directions. The time lapse between pulses may signal the scanning rate in one or both directions.

In accordance with another important aspect of the invention, the duration of the pulses may be selected and controlled in response to the selection of a transmission mode as well as the time lapse between pulses. In the preferred embodiment, the selected duration is short relative to the selected time lapse.

In accordance with yet another important aspect of the invention, the modulator means may include modulating means for generating modulated signals representing the synchronizing signals. The mode signaling means may include means for selecting and controlling the modulation during the pulses so as to signal a transmission mode.

The preferred embodiment of the invention also comprises a facsimile unit for reproducing dark-light variations in a copy representing a facsimile of the transmitted document. Writing means produce dark-light variations on a copy medium in response to the output of a detector means which demodulates received signals representing dark-light variations in the document as scanning means scan the writing means relative to the copy medium. The detector means also demodulates the received signals representing the synchronizing signals including the synchronizing pulses to determine the time lapse between pulses. In addition, the detector means may determine the duration of the pulses and/or demodulate signals representing the pulses and the time lapse between pulses.

DETAILED DESCRIPTION OF A PREFERRED EMBODIMENT

Figure 1:
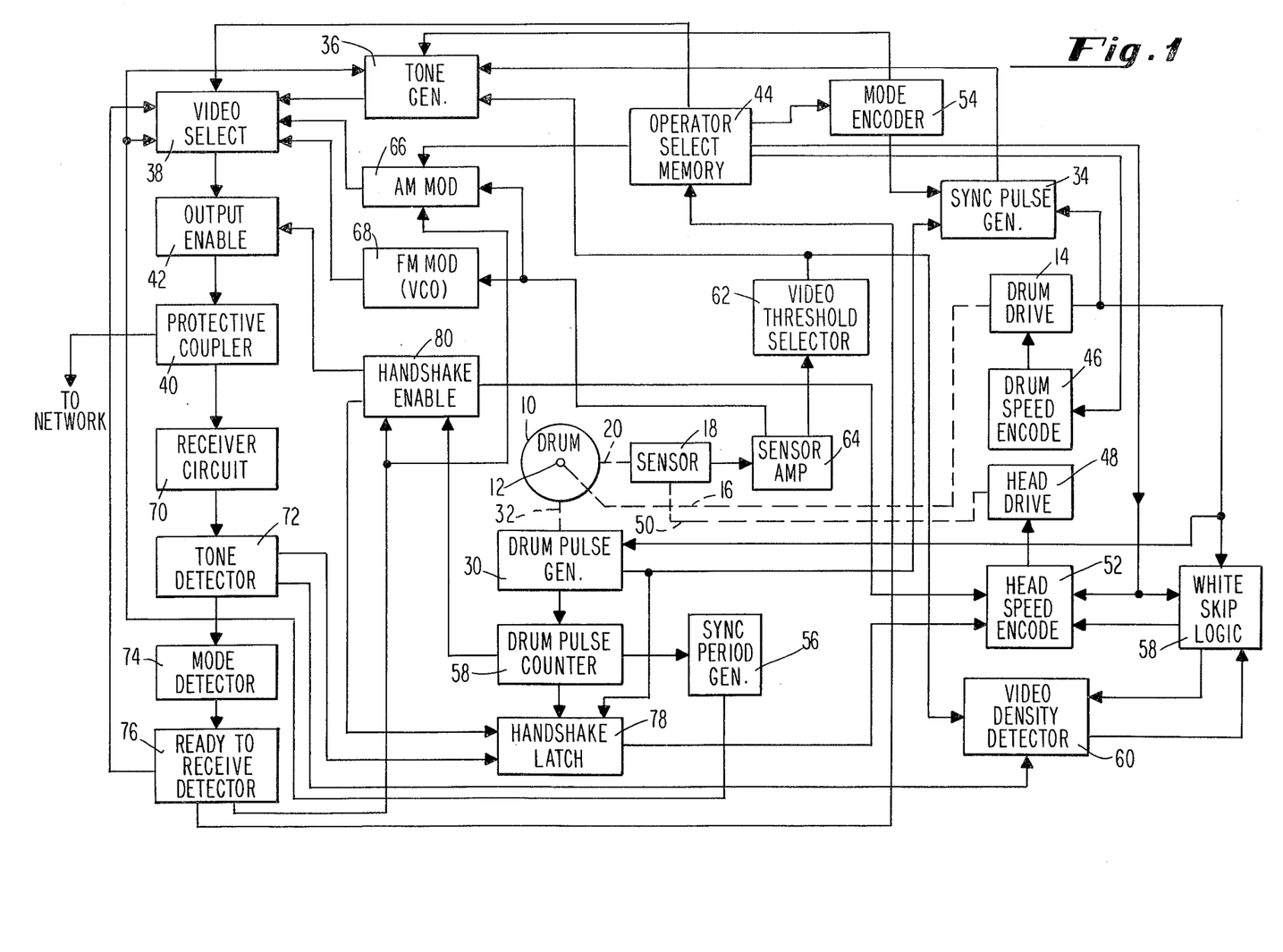
FIG. 1 is a block diagram of a facsimile transmitter embodying the principles of this invention.

Referring to FIG. 1, the facsimile unit for transmitting signals representing dark-light variations in a document to a remote location is shown in block form. The document containing the dark-light variations is wrapped around a drum 10 which is rotated about its axis 12 by a drum drive 14 through a mechanical coupling depicted by a broken line 16.

A sensor 18 is juxtaposed to the surface of the drum 10 and the document carried thereon so as to optically communicate with the document and the dark-light variations thereon as depicted by a broken line 20.

Figure 1A:
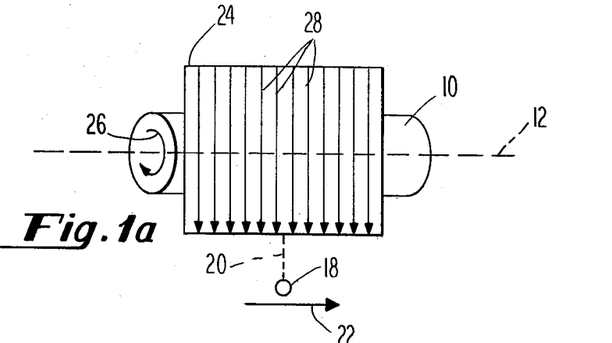
FIG. 1a is a schematic diagram illustrating the scanning of a document by the transmitter of FIG. 1.

Referring to FIG. 1a, the motion of the sensor 18 in a direction depicted by an arrow 22 generally parallel to the axis 12 of the drum 10 produces two orthogonal scanning motions of the sensor 18 relative to a document 24 which is adapted to be wrapped around the drum 10. More particularly, rotation of the drum 10 about the axis 12 in a direction depicted by an arrow 26 produces a plurality of side-by-side scan lines 28 which traverse the document 24 from one edge to an opposing edge in one orthogonal direction while the sensor 18 is advanced in the direction 22 so as to traverse the document 24 from another edge to an opposing edge in the other of the orthogonal directions.

As the drum 10 rotates, a drum pulse generator 30 receiving a tachometric (hereinafter "tach") signal from the drum drive 14 is coupled to the drum 10 as depicted by a broken line 32 produces a pulse for each rotation of the drum 10 about the axis 12. The output from the drum pulse generator 30 is applied to a sync pulse generator 34 to generate a sync pulse representing a predetermined relationship between the position of the drum 10 relative to the sensor 18, and more particularly, the position of the opposing edges of the document 24 which extend parallel with the axis of the drum 12 relative to the sensor 18.

In accordance with one important aspect of this invention, the drum pulses from the drum pulse generator 30 are coupled to the sync pulse generator 34 so as to produce a time lapse between sync pulses which corresponds to a particular scanning rate of the drum 10 which is characteristic of a particular mode of operation for the transmitter. The sync pulses from the sync pulse generator 34 are then applied to a tone generator 36 to produce frequency modulated signals representing the sync pulses and the time lapse between sync pulses. The output from the tone generator 36 is then applied to a video select circuitry 38 under the control of an operator select memory 44. A protective telephone coupler circuit 40 applies frequency modulated synchronizing signals representing a particular scanning mode for the transmitter to the telephone network or other communications link in response to and under the control of an output enable circuit 42 coupled between the protective coupler 40 and the video select circuit 38.

In accordance with this invention, the time lapse between synchronizing pulses is under the control of the operator select memory 44 which is coupled to a drum speed encode circuit 46. The output of the drum speed encode circuit 46 is in turn coupled to the drum drive 14 so as to control the tachometric or tach signal applied to the sync pulse generator 34 from the output of the drum drive 14 and the drum pulse generator 30 and thus the time lapse between sync pulses.

As also shown in FIG. 1, the sensor 18 is coupled to a head drive 48 as depicted by a broken line 50. The head drive 48 produces the motion depicted by the arrow 22 shown in FIG. 1a. The particular speed of the sensor 18 as determined by the head drive 48 is under the control of head speed encode circuitry 52 which is coupled to the operator select memory 44 so as to permit the operator to actually select the head speed depending upon the particular scanning mode chosen.

In accordance with another important aspect of this invention, the time lapse between the sync pulses produced by the generator 34 may also represent the scanning rate in the direction 22 as shown in FIG. 1a. In this regard, it will be understood that the particular drum speed in the direction of rotation 26 as shown in FIG. 1a may be chosen to correspond with particular head speeds in the direction 22 so that a time lapse between sync pulses will indicate the scanning rate in each of two orthogonal directions. Accordingly, information is transmitted from the transmitter via the coupler 40 which signals the scanning rate mode in each of two orthogonal scanning directions.

In accordance with another important aspect of the invention, mode signaling from the transmitter is also accomplished by varying the duration of the sync pulses as well as the time lapse between sync pulses. In this connection, a mode encoder 54 is provided which is coupled to the operator select memory 44 and the sync pulse generator 34. The operator may therefore select a particular synchronizing pulse width to signal a particular mode. In the preferred embodiment of the invention, different synchronizing pulse widths are utilized to signal two different modes having the same drum speed but differing head speeds.

In accordance with yet another aspect of the invention, the frequencies of the synchronizing signals including the pulses and the time lapse between pulses ae selected and controlled so as to signal particular transmission modes. This is accomplished by the mode encoder 54 which is also coupled to the tone generator 36 so as to produce selected tones or frequencies in response to the output from the sync pulse generator 34 during the synchronizing period. In the preferred embodiment of the invention, the specific single frequencies of the synchronizing signals are utilized to identify a particular mode wherein a particular bandwidth is utilized to transmit the dark-light information after the synchronizing period has been completed as determined by a sync period generator 56 coupled to the output of a drum pulse counter 58 which receives a pulse for each revolution of the drum 10.

The frequencies of the synchronizing signals are also utilized to signal a particular transmission time compression mode. In this particular mode, areas of the document having little or no video information are scanned at faster scanning rates under the control of white skip logic circuitry 58 which is coupled to the head speed encode circuit 52 and the operator select memory 44. When operating in this time compression mode, a high speed enable signal is applied from the white skip logic circuit 58 to a video density detector 60 which determines the density of video or black information on the document. To accomplish this purpose, the video density detector 60 is coupled to a threshold detector 62 which is responsive to the output of a sensor amplifier 64 connected to the sensor 18. The video threshold detector is coupled to the tone generator 36. The output from the video density detector 60 is applied to the white skip logic 58 to indicate low video or dark information density. The white skip logic 58 then signals the high speed encode circuit 52 to speed up the head drive. On the other hand, when the video or black information density increases, the output from the video density detector supplied to the white skip logic 58 reduces the head drive 48 under the control of the head speed encode circuit 52.

The frequency of the synchronizing signals may also be utilized to signal a mode wherein a particular modulation scheme is utilized. In accordance with this aspect of the invention, the transmitter of FIG. 1 includes an AM modulator 66 coupled to the video select circuit 38 and the sensor amplifier 64. The operator select memory 44 is coupled to and capable of activating the AM modulator circuit 66.

As noted previously, the frequency of the synchronizing signals may be utilized to signal the particular bandwidth of a transmission mode. In this connection, it will be noted that an FM modulator 68 in the form of a VCO coupled to the sensor amplifier 64 is provided in addition to the tone generator 36. The FM modulator 68 which is coupled to the video select circuit 38 is capable of providing a relatively large number of gray scale levels as compared to the two levels (black and white) of tone generator 36. In other words, the tone generator 36 when transmitting dark-light information merely transmits black or white in response to the output of the video threshold detector 62 whereas the modulator 68 is capable of providing a gray scale in a broader bandwidth in response to the output of the sensor amplifier 64.

In accordance with copending application Ser. No. 886,135 filed Mar. 13, 1978 assigned to the assignee of this invention, and incorporated herein by reference, the transmitter of FIG. 1 includes detector means for demodulating a ready to receive signal originating from and identifying a remotely located receiving unit. The detector means includes a receiver circuit 70 having an input coupled to the protective coupler 40 and an output coupled to a tone detector 72. The tone detector 72 is in turn coupled to a mode detector 74 having an output coupled to a ready to receive tone detector 76 which identifies the capabilities of the remotely located receiving unit. The output from the ready to receive tone detector 76 is coupled to the video select circuit 36, the operator select circuit 44 as well as the AM modulator 66 so as to permit the selection of AM modulation for transmitting the dark-light information should that be the choice of the operator. The output of the tone detector 72 is also coupled to the video density detector so as to permit the selection of the time compression mode should that be the choice of the operator.

In accordance with the invention of copending application Ser. No. 886,136 filed Mar. 13, 1978, assigned to the assignee of this invention and incorporated herein by reference, the detector means including the tone detector 72 demodulates handshake signals transmitted from a receiving unit during predetermined intervals when the transmission signals representing dark-light variations in a document are absent. The output from the tone detector 72 is then applied to a handshake latch 78 and an output from the ready to receive tone detector 76 is applied to a handshake enable circuit 80 when the detector 76 detects a receiving unit capable of generating handshake signals. The handshake signals are utilized to advise the transmitter that the receiver is still receiving information from the transmitter. The latch 78 is coupled to the head speed encoder 52 so as to permit a transmission to be aborted should a handshake signal fail to arrive within a predetermined interval at the handshake latch 78. The head drive 48 may then be returned automatically to the start position. The particular intervals are determined at the handshake latch 78 in response to an output from the drum pulse counter 58. The counter 58 is also coupled to the handshake enable circuit 80. The handshake enable circuit 80 also enables the output enable circuit 42. Strobing of the handshake latch 78 at predetermined intervals to determine if the tone detector has detected a handshake signal is accomplished by the output of the drum pulse generator 30.

In order to avoid missing the transmission of any dark-light information during the handshake, it is necessary to inhibit the motion of the head drive in the transmitting and the receiving unit during the same predetermined interval. In this connection, the head speed encode circuit 52 is connected to the handshake enable circuit 80 so as to assure that the sensor motion and head drive will be inhibited during the predetermined interval as determined by the drum pulse counter 58.

Figure 2:
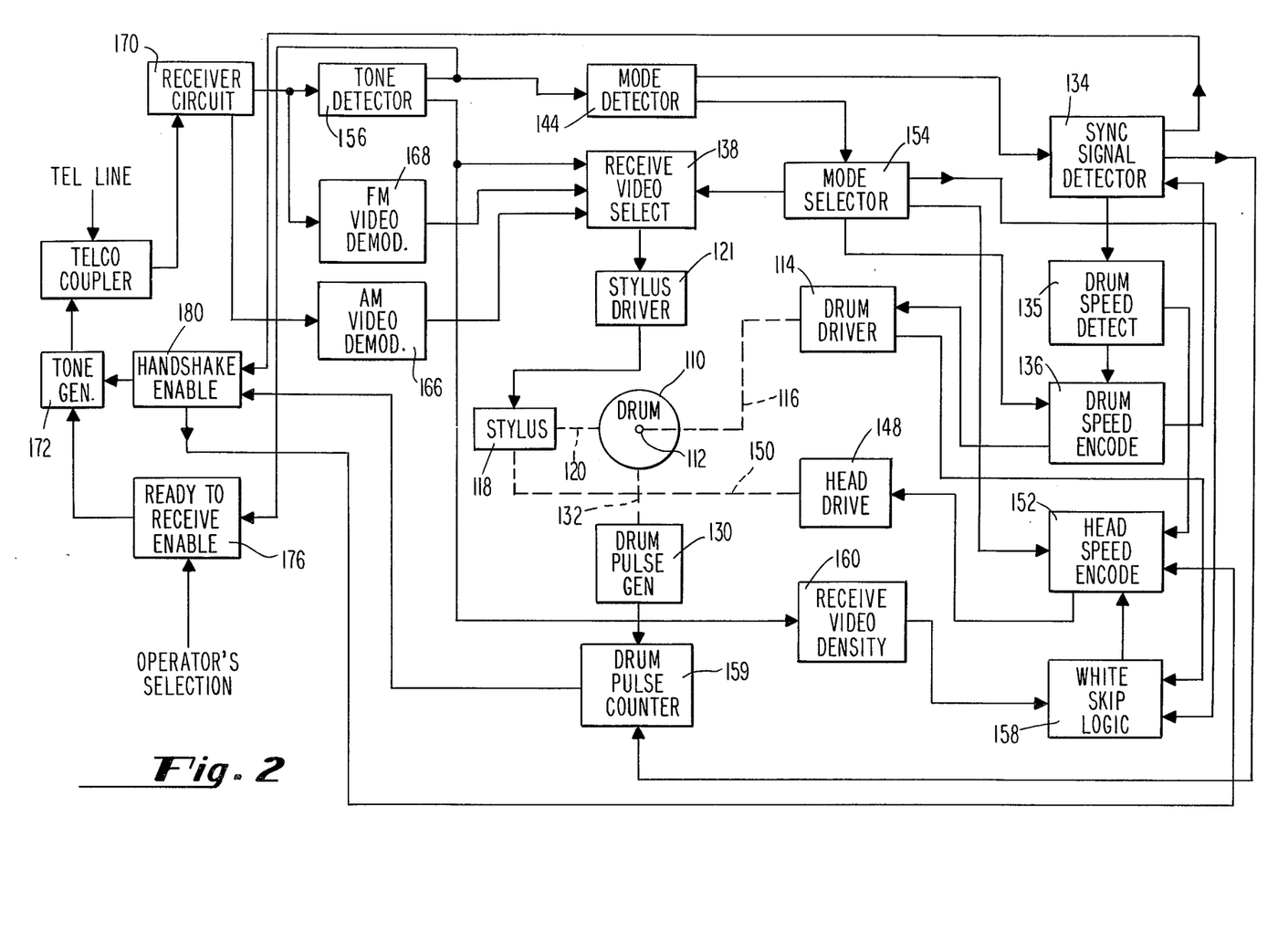
FIG. 2 is a block diagram of a facsimile receiver embodying the principles of this invention.

Reference will now be made to FIG. 2 wherein a facsimile unit for reproducing dark-light variations on a copy medium in response to received signals from a remote location is shown. The receiving facsimile unit comprises a drum 110 adapted to rotate about an axis 112. The drum 110 is rotated about the axis 112 by a drum drive 114 which is coupled to the drum 110 as depicted by the line 116.

A writing means such as a stylus 118 is coupled to the copy medium carried on the drum 110 as depicted by the broken line 120. The stylus 118 is coupled to a stylus driver 121 which is responsive to the receive video select circuit 138.

For the sake of simplicity, the scanning motion with respect to the copy medium carried by the drum 110 will not be described in detail. It will however be understood that the scanning motion is identical to that described with reference to the document shown in FIG. 1a except that the stylus 118 moves parallel to the axis of the drum 110 rather than the sensor. The motion of the stylus 118 is provided by a head drive 148 which is coupled to a head carrying the stylus 118 as depicted by the broken line 150.

In accordance with this invention, the receiving unit comprises a mode detector 144 coupled to the output of a tone detector 156. The mode detector in conjunction with a mode selector 154, a sync signal detector 134 and a drum speed detect circuit 135 are capable of establishing a mode of operation at the receiver responsive to the particular transmitter mode as detected by the mode detector 144.

More particularly, the sync signal detector 134 and the drum speed detect circuit 135 are capable of determining the time lapse between the synchronizing signals received from the transmitter to establish the appropriate scanning rates for both orthogonal scanning directions at the drum 110. In this connection, the drum speed detect circuit 135 is coupled to both the drum speed encode circuit 126 as well as the head speed encode circuit 152.

The mode selector circuit 154 is also capable of activating the white skip logic circuitry 158 which is coupled to the head speed encode circuit 152. The white skip logic circuit 158 is responsive to the output from the receive video density 160 which is coupled to the tone detector 136 as well as tach signals from the drum drive 114. The output from the white skip logic 158 is applied to the head speed encode 152 to appropriately increase and decrease the scanning rate of the stylus 118 parallel to the axis of the drum 110 in response to the video or black information density received by the receiver circuit 170. In controlling the white skip logic and in accordance with one important aspect of the invention, the mode selector 154 is responsive to the frequencies of the synchronizing signals.

In accordance with another important aspect of the invention, the mode selector 154 is responsive to the duration of the sync pulses in the synchronizing signal to control the scanning rate of the stylus 118. In this connection, the output from the mode selector 154 is applied to the head speed encode 152.

In accordance with another important aspect of the invention, the mode selector 154 is responsive to the frequencies of the synchronizing signal to place the receiver in a particular mode for receiving a particular type of modulation, i.e., FM or AM, or receiving FM in a particular bandwidth. In this connection, the receive video select circuit 138 is coupled to the output of the mode selector 154 to select one of a plurality of outputs from various detectors including the tone detector 156 which detects a narrow bandwidth FM, an FM video detector 168 which detects a wider bandwidth and an AM video detector 166.

In accordance with the invention of the aforesaid copending application Ser. No. 886,135, the receiving unit includes a tone generator 172 for generating tones in response to a ready to receive enable circuit 176 so as to identify the mode capabilities of the receiving unit. The ready to receive tone is activated by an operator prepared to receive a facsimile document. Through the generation of appropriate tones, the capability of the receiving unit with respect to AM and FM demodulation and/or white skip logic may be identified by the transmitting unit described with reference to FIG. 1. The ready to receive enable circuit is coupled to the output of the tone detector 136 so as to permit the circuit 176 to be inhibited on receiving a predetermined signal from the transmitter.

In accordance with the invention of the aforesaid copending application Ser. No. 886,136 filed Mar. 13, 1978, the receiving unit also includes a handshake enable circuit 180 which is coupled to the tone generator 172. The handshake signal from the handshake enable circuit 180 is generated at predetermined intervals as determined by a drum pulse counter 159 coupled to the output of a drum pulse generator 130. The drum pulse generator 130 is coupled to the drum as depicted by the broken line 132. The handshake enable circuit is only enabled in the receiving unit when the sync signal detector 134 has indicated that a compatible sync signal has been detected. The handshake enable circuit 180 is coupled to the head speed encode circuit 152 to inhibit the head drive during the handshake period. The head speed encode circuit is also coupled to the drum pulse counter 159.

Figure 3:
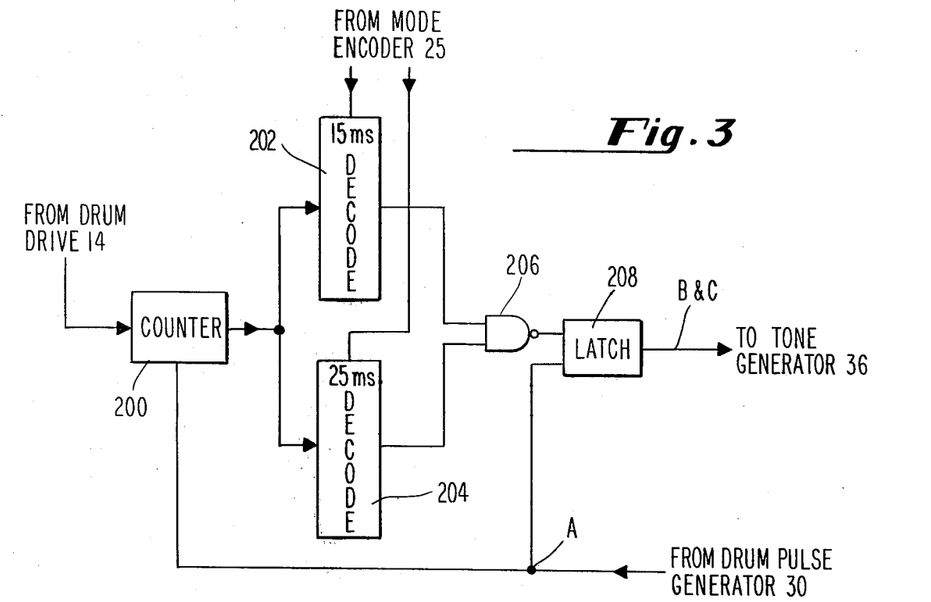
FIG. 3 is a schematic circuit diagram of the sync pulse generator shown in block form in FIG. 1.

Reference will now be made to FIG. 3 for a more detailed description of the sync pulse generator 34. In accordance with this invention, both the duration and time lapse between sync pulses is controlled for most signaling purposes. In order to signal scanning speeds of various modes, the drum pulses which are generated by the drum pulse generator 30 are utilized to reset a counter 200 which receives tach pulses from the drum drive 14. The various outputs from the counter 200 are applied to a pair of decoders 202 and 204 which set the duration of the sync pulses (i.e., 15 msec. or 25 msec) depending upon the particular decoder enabled by the mode encoder 54. The decoded output from the decoder 202 or the decoder 204 is applied to a NAND gate 206 which sets a latch 208 which was previously reset by the pulse from the drum pulse generator 30 which was also utilized to reset the counter 200. The output from the latch 208 which is of the D type is then applied to the tone generator 36.

In order to better understand the operation of the sync pulse generator 34 in accordance with the principles of this invention, reference will now be made to FIG. 4. Drum pulses 210 of waveform A are shown as substantially equally spaced. It will be understood that these drum pulses are spaced by a distance which is proportional to the rotational scanning speed of the drum 10. The spacing between the pulses 210 is therefore indicative of the particular rotational scanning speed of the drum chosen for the transmission mode.

Waveform B discloses sync pulses 212 which are produced at points B and C at the output of the latch 208 in FIG. 3 when the 15 msec. decoder 202 is enabled. As in the case of the pulses 210, the spacing between the pulses 212 is indicative of the particular drum scanning speed for the chosen transmission mode. The duration of the pulses is, for the most part, under the control of the decoder 202. However, it will be understood as discussed subsequently that the duration of the pulses 212 is also a function of the drum speed since the pulses which advance the counter 200 are tach pulses from the drum drive 14 and will vary in frequency with the drum drive. Waveform C of FIG. 4 shows sync pulses 214 which are of longer duration, nominally 25 msec., at the points B and C at the output of the latch 208 in FIG. 3. The nominal 25 msec. duration of the pulses 214 is, for the most part, under control of the decoder 204. However, as in the case of the 15 msec. pulses, the speed of rotation of the drum 10 also affects the duration of the pulses.

Figure 4:
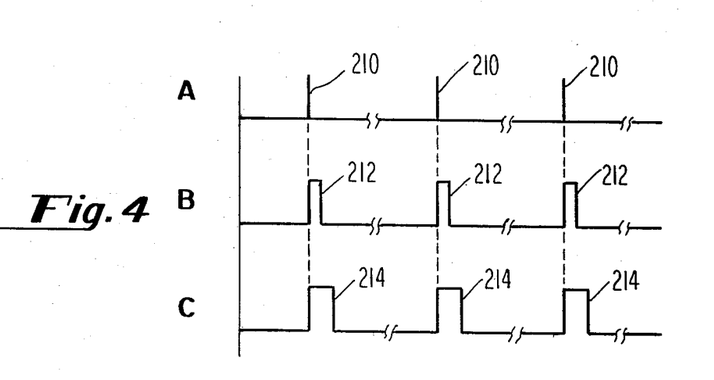
FIG. 4 is a diagram of waveforms generated by the circuit of FIG. 3.
Figure 5:
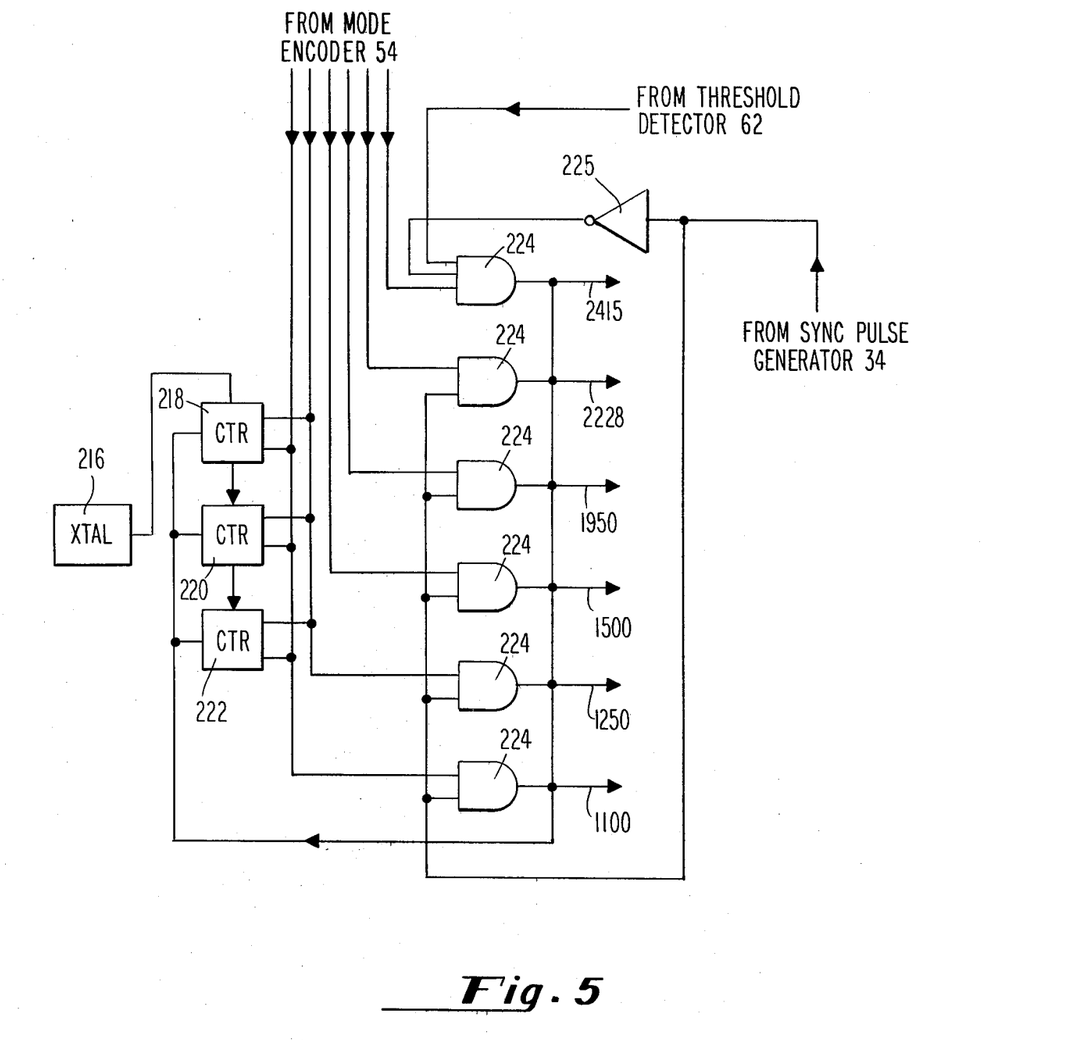
FIG. 5 is a schematic diagram of the tone generator shown in block form in FIG. 1.

The sync pulses 212 or 214 of FIG. 4 as generated at the B and C output of the latch 208 of FIG. 3 are applied to a tone generator 36 as shown in FIG. 1 where tones are generated which correspond to the pulses 212 and 214 and the spaces between the pulses 212 and 214. As shown in FIG. 5, these tones are generated through the use of a crystal source 216 associated with a plurality of counters 218, 220 and 222 having outputs selectively hardwired to a plurality of NAND gates 224 which produce various tones which are utilized to represent the pulses 212 and 214 of FIG. 4 and the spaces therebetween. The hardwiring is arranged such that each of the gates 224 will be enabled more or less frequently than the others depending upon the particular hardwired connections to the counters 218, 220 and 222. As shown in FIG. 5, the outputs from the gates 224 are labeled with the following four digit numbers which substantially correspond with frequencies of pulses produced at the outputs of the respective AND Gates 224: 2415, 2228, 1950, 1500, 1250 and 1100. In actuality, the outputs of the AND gates 224 are substantially equal in frequency to the indicated frequencies times a multiple so as to produce a higher frequency pulse train than the output from the transmitter as described in copending application Ser. No. 884,298 filed Oct. 21, 1977.

As shown in FIG. 5, the uppermost AND gate 224 will only be enabled in the absence of a pulse generated by the sync pulse generator 34 in response to the output of an inverter 225. Accordingly, the output from the AND gate 224 corresponding to the 2415 Hz. frequency will only be generated between the sync pulses 212 and 214 shown in FIG. 4. On the other hand, depending upon the particular encoding done by the mode encoder 54, the other AND gates 224 corresponding to the other tone generator output frequencies will be enabled by the sync pulses. Of course, the AND gates 224 corresponding to lower frequencies will never be enabled if a higher frequency AND gate 224 is enabled since the outputs of all of the AND gates 224 are utilized to reset the counters 218, 220 and 222 at any time a pulse is generated from one of the enabled AND gates 224.

In certain modes, the tone generator of FIG. 5 is used to generate signals representing dark-light variations in the document after the sync period and mode signaling have been completed. In this connection, the output from the threshold detector 62 is coupled to one of the AND gates 224 so as to produce a 2415 Hz. output corresponding to a dark area of the document. In the absence of the 2415 Hz. output, one of the other AND gates 224 is enabled, e.g., the one producing the 2228 Hz. output.

It should therefore be understood that FIG. 5 allows the transmit frequency of the sync pulse to be varied so as to indicate a particular mode of transmission. A sync pulse which is represented by a transmission of 2228 Hz. will indicate one mode while a sync pulse transmitted at a frequency of 1250 Hz. will indicate another transmission mode.

In the foregoing, three different techniques have been disclosed for signaling the particular transmission mode. First, the transmission mode may be signaled by varying the time lapse between sync pulses 212 and 214 as shown in FIG. 4. Second, the duration of the sync pulses 212 and 214 of FIG. 4 may be varied. And third, the frequency of the sync pulses as transmitted may be varied to indicate a transmission mode. Finally, the sync pulse time lapse, duration and frequency may be varied in different combinations.

To demonstrate the signaling capability of the preferred embodiment of this invention, the following chart is presented:

| | Signaling for Various Modes | | | | | |
|---|---|---|---|---|---|---|
| | Mode | | | Sync | | |
| | Type | Speed (min.) | Video | Freq. (Hz.) | Pulse Duration (ms) | Pulse Time Lapse(ms) |
| 1. | FM/DOCUMENT* | 2 | 2228/2415(Hz.) | 2228/2415 | 9 | 190 |
| 2. | FM/DOCUMENT | 3 | 2228/2415 | 2228/2415 | 11 | 222 |
| 3. | FM/DOCUMENT | 4 | 2228/2415 | 2228/2415 | 17 | 333 |
| 4. | FM/DOCUMENT | 6 | 2228/2415 | 2228/2415 | 27 | 333 |
| 5. | FM/DOCUMENT | 15 | 2228/2415 | 2228/2415 | 27 | 555 |
| 6. | FM/PICTURE** | 2 | 1500/2415 | 1250/2415 | 9 | 190 |
| 7. | FM/PICTURE | 3 | 1500/2415 | 1250/2415 | 11 | 222 |
| 8. | FM/PICTURE | 4 | 1500/2415 | 1250/2415 | 17 | 333 |
| 9. | FM/PICTURE | 6 | 1500/2415 | 1500/2415 | 17 | 333 |
| 10. | FM/PICTURE | 15 | 1500/2415 | 1500/2415 | 28 | 555 |
| 11. | FM/DOCUMENT-SKIP | 2 | 2228/2415 | 1950/2415 | 9 | 190 |
| 12. | FM/DOCUMENT SKIP | 3 | 2228/2515 | 1950/2415 | 11 | 222 |
| 13. | FM/DOCUMENT-SKIP | 4 | 2228/2415 | 1950/2415 | 17 | 333 |
| 14. | FM/DOCUMENT-SKIP | 6 | 2228/2415 | 1950/2415 | 27 | 333 |
| 15. | FM/DOCUMENT-SKIP | 15 | 2228/2415 | 1950/2415 | 28 | 555 |
| 16. | FM/PICTURE-SKIP | 2 | 1500/2415 | 1100/2415 | 9 | 190 |
| 17. | FM/PICTURE-SKIP | 3 | 1500/2415 | 1100/2415 | 11 | 222 |
| 18. | FM/PICTURE-SKIP | 4 | 1500/2415 | 1100/2415 | 17 | 333 |
| 19. | FM/PICTURE-SKIP | 6 | 1500/2415 | 1100/2415 | 27 | 333 |
| 20. | FM/PICTURE- | 15 | 1500/2415 | 1100/2415 | 28 | 555 |

-continued
Signaling for Various Modes

| | Mode | | | | Sync | |
|---|---|---|---|---|---|---|
| | Type | Speed (min.) | Video | Freq. (Hz.) | Pulse Duration (ms) | Pulse Time Lapse(ms) |
| | SKIP | | | | | |
| 21. | AM/DOCUMENT | 2 | AM | 2415/2228 | 9 | 190 |
| 22. | AM/DOCUMENT | 3 | " | 2415/2228 | 11 | 222 |
| 23. | AM/DOCUMENT | 4 | " | 2415/2228 | 17 | 333 |
| 24. | AM/DOCUMENT | 6 | " | 2415/2228 | 27 | 333 |
| 25. | AM/DOCUMENT | 15 | " | 2415/2228 | 28 | 555 |
| 26. | AM/PICTURE | 2 | " | 2415/1250 | 9 | 190 |
| 27. | AM/PICTURE | 3 | " | 2415/1250 | 11 | 222 |
| 28. | AM/PICTURE | 4 | " | 2415/1250 | 17 | 333 |
| 29. | AM/PICTURE | 6 | " | 2415/1250 | 27 | 333 |
| 30. | AM/PICTURE | 15 | " | 2415/1500 | 28 | 555 |
| 31. | AM/DOCUMENT-SKIP | 2 | " | 2415/1250 | 9 | 190 |
| 32. | AM/DOCUMENT-SKIP | 3 | " | 2415/1950 | 11 | 222 |
| 33. | AM/DOCUMENT-SKIP | 4 | " | 2415/1950 | 17 | 333 |
| 34. | AM/DOCUMENT-SKIP | 6 | " | 2415/1950 | 27 | 333 |
| 35. | AM/DOCUMENT-SKIP | 15 | " | 2415/1950 | 28 | 555 |
| 36. | AM/PICTURE-SKIP | 2 | " | 2415/1100 | 9 | 190 |
| 37. | AM/PICTURE-SKIP | 3 | " | 2415/1100 | 11 | 222 |
| 38. | AM/PICTURE-SKIP | 4 | " | 2415/1100 | 17 | 333 |
| 39. | AM/PICTURE-SKIP | 6 | " | 2415/1100 | 27 | 333 |
| 40. | AM/PICTURE-SKIP | 15 | " | 2415/1100 | 28 | 555 |

*Document mode is equivalent to two level gray scale of blackand white only.
**Picture mode permits transmission of a gray scale exceedingtwo levels.

Under the mode columns, the type or nature of modulation utilized in the transmission as well as the speed or duration of the transmission in minutes is indicated. For example, the first row indicates a transmission mode wherein frequency modulation (FM) is utilized with "document" or two level gray scale for use in transmitting documents without pictorial matter. The speed or duration of the transmission is indicated as two minutes.

In the video column, the nature of the modulation is further identified. Where as in the first row, frequency modulation is utilized, the particular frequencies for light and dark regions are indicated as 2228 Hz. and 2400 Hz. respectively. At other rows in the video column corresponding to an AM mode, the term AM is simply indicated without regard to a particular AM frequency or type of AM modulation.

In the sync columns of the chart, the frequencies, pulse duration and time lapse between pulses of the synchronizing signal are indicated. Again referring to the first row, the two minute and FM/document mode is signaled by utilizing a white frequency corresponding to the synchronizing pulses of 2228 Hz. and a black or dark frequency corresponding to the spaces between synchronizing pulses of 2415 Hz. An actual sync pulse duration of 9 msec. is utilized while the time lapse between sync pulses is 190 ms.

It will be seen that the first five modes indicated by the first five rows differ only in the speed or duration of transmission. In modes 1, 2, 3 and 5, this difference in speed or duration of transmission is reflected in the time lapse between the sync pulses since the rotation of the drum 10 does differ from mode to mode. Accordingly, the particular transmission mode may be signaled by the time lapse between sync pulses. However, the speed of rotation of the drum in both modes 3 and 4 is identical as reflected by the equal time lapse in sync pulses. In this instance, pulse duration is utilized to signal the particular mode, i.e., 17 msec. versus 27 msec.

In order to distinguish modes 1–5 from modes 6–10, the frequency of the sync pulses is varied. Note that the pulse duration of the sync pulses for modes 8 and 9 are equal as are the time lapses between sync pulses. In order to distinguish these two modes, a slight deviation in frequency is utilized for the sync pulses, i.e., 1250 Hz. versus 1500 Hz.

In a similar manner, modes 11–15 and 16–20 are distinguished from the other modes by utilizing different frequencies representing the sync pulses.

In the AM mode, the frequencies of sync pulses and the spaces between the sync pulses are reversed with respect to the frequencies utilized in modes 6–10 and 16–20.

Having now discussed the generation of mode indicating signals by the transmitter and specific circuitry for generating these signals, the circuitry of the receiver which must be capable of detecting these mode signals will now be discussed in detail.

Figure 6:
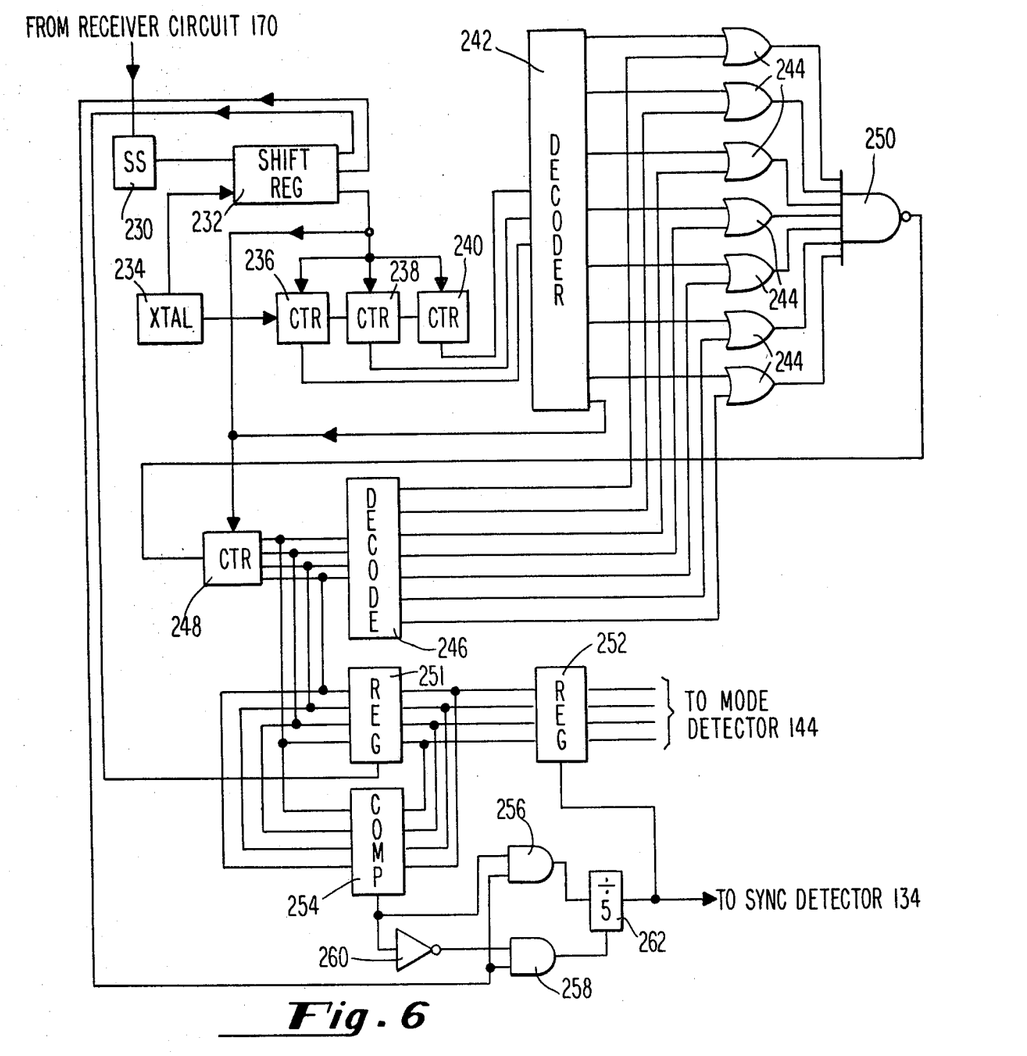
FIG. 6 is a schematic circuit diagram of the tone detector shown in block form in FIG. 2.
Figure 7:
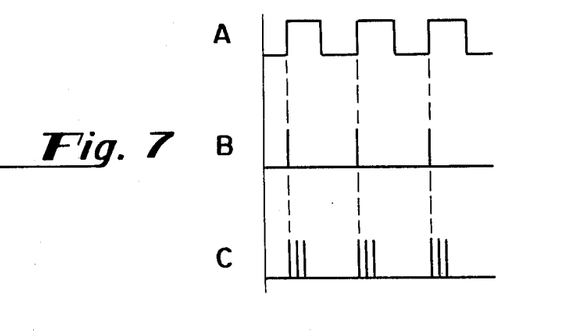
FIG. 7 is a diagram of waveforms generated in the circuit of FIG. 6.

FIG. 6 shows in detail the tone detector 136 illustrated in block form in FIG. 2. The tone detector 136 comprises a single shot multivibrator 230 which transforms the square wave output from the receiver circuit 170 shown in waveform A of FIG. 7 to brief pulses of relatively short duration as shown in waveform B. The single shot pulses of FIG. 7B are applied to a shift register 232. The shift register 232 produces groups of three closely spaced strobe, shift and clear pulses as shown in waveform C in response to each output pulse from the single shot multivibrator 230 and a crystal source 234.

The pulses of waveform C are utilized in conjunction with pulses from crystal source 234 to detect the frequency of the square wave from the receiver circuit 170 in the following way.

Pulses from the crystal source 234 are applied to a chain of counters 236, 238 and 240 which are reset in response to each clear pulse from the shift register 232. The outputs from the counters 236, 238 and 240 are then applied to a decoder 242 having decoding output lines connected to OR gates 244. Each of the OR gates 244 also has an enabling input from a decoder 246 which decodes the output from a counter 248 which is advanced by the output of a NAND gate 250 which is coupled to the outputs of the OR gates 244. The output of the counter 248 produces a signal representing the frequency of the preceding square wave to the input of single shot multivibrator 230.

In this connection, it will be understood that the OR gates 244 go low sequentially as the count of the counter 248 advances in response to output pulses from the NAND gate 250. The higher the count of the counter 248 just prior to a clear pulse from the shift register 232, the lower the frequency of the square wave input signal shown in waveform A of FIG. 7. Thus, the output of the counter 248 just prior to a clear pulse represents an approximate frequency of the square wave input of waveform A.

The output of the counter 248 representing the frequency of the square wave A shown in FIG. 7 is placed in register 251 at strobe pulse time. The count in the register 251 is presented to output register 252 but not loaded into register 252 at this time.

The count at the input to the register 251 is constantly compared with the count at the output of the counter 251 by a comparator 254. The output from the comparator 254 is applied to one AND gate 256 with strobe pulses from the shift register 232 and a second AND gate 258 through an inverter 260 along with the strobe pulses from the shift register 232. A divide-by-5 counter 262 is coupled to the output of the gates 256 and 258. The counter 262 is advanced one count when the output after the comparator 254 indicates that the input and the output at the register 251 are of equal magnitude. The advancing of the counter 262 occurs at shift pulse time when the input and the output of the register 251 are of equal magnitude. When the comparator 254 does not detect equal magnitude at shift pulse time, the gate 258 clears the counter 262 at shift pulse time. After the counter 262 has been advanced after five consecutive cycles of the same frequency of the square wave A, the register 252 is loaded by the information then present at the output of the register 251. The output of register 252 now represents the decoded frequency in binary form.

Figure 8:
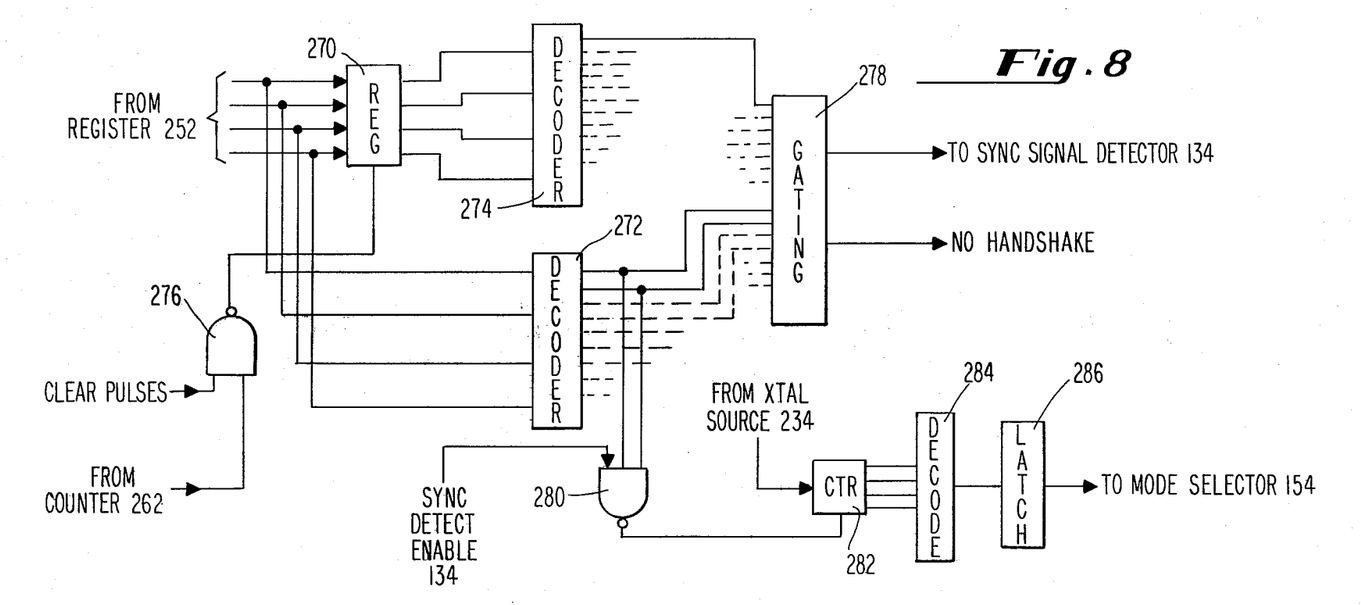
FIG. 8 is a schematic circuit diagram of the mode detector shown in block form in FIG. 2.

Reference will now be made to FIG. 8 for a detailed description of the mode detector 144 shown in block form in FIG. 2. The output from the register 252 shown in FIG. 6 is applied to a register 270 and a decoder 272. The output of the register 270 is coupled to a decoder 274. Clear pulses applied to a NAND Gate 276 along with a valid tone detected signal from the counter 262 load the register 270 at clear pulse time. When the black/white transition as decoded by the decoders 272 and 274 indicate that a valid synchronizing pulse has been received, gating circuitry 278 is enabled so as to apply a valid transition signal to the sync detector 134 shown in FIG. 2. The input from the register 252 is continuously loaded into the register 270 in response to the output of the gate 276.

It will be understood that valid transitions represent changes in frequency (in either direction) between 2400 Hz. and one of the following: 1100, 1250, 1500, 1950 and 2228 Hz. In other words, the output from the gating circuit 278 which is applied to the sync signal detector 134 will only be enabled when one of these transitions has been detected.

The mode detector 144 also comprises a NAND gate 280 coupled to a counter 282. The output of the counter 282 is connected to a decoder 284 which sets a latch 286 when a sync detect enable signal is applied to an input of the NAND gate 280. When the decoder 272 detects in-band signals below 2400Hz. and a valid sync detect enable from the detector 134, then the gate 280 permits the counter 282 to count pulses from the crystal source 234. In other words, the counter is allowed to advance during the white frequency sync pulses. Once the output of the NAND gate 280 goes high in response to a black 2400 Hz. or out of band signal, counter 282 ceases to count. The decoder 284 then sets the latch 286 into one of two states depending upon whether the decoded count as determined by the decoder 284 represents more than or less than 20 msec., i.e., a nominal 15 msec. or a nominal 25 msec. In other words, the duration of the sync pulses are determined by the counter 282 in conjunction with the decoder 284 to set the latch 286 so as to indicate the duration of the sync pulses thereby indicating a particular mode of operation by detecting the various pulse durations.

Figure 9:
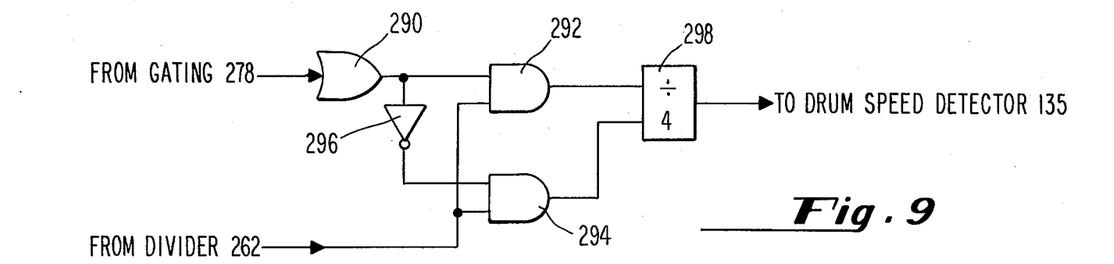
FIG. 9 is a schematic circuit diagram of the sync signal detector shown in block form in FIG. 2.

Referring now to FIG. 9, the sync signal detector 134 will be described in detail. As shown therein, the sync signal detector 134 comprises an OR gate 290 connected directly to one AND gate 292 and a second AND gate 294 through an inverter 296. The AND gates 292 and 294 are enabled in response to outputs from the divider 262 of the tone detector 136 which indicates that a valid tone has been received. If a valid tone has been received as indicated by the output from the divider 262 and a valid transition has been detected as indicated by the gating 278, the pulses from the output of the AND gate 292 are applied to a divide-by-4 counter 298. When four such valid sync transition pulses have been applied to the counter without a reset pulse from the output of the AND gate 294, the counter 298 is arranged to latch and provide a sync detected output signal which is applied to the drum speed detector 135 which will now be described in detail with reference to FIG. 10.

Figure 10:
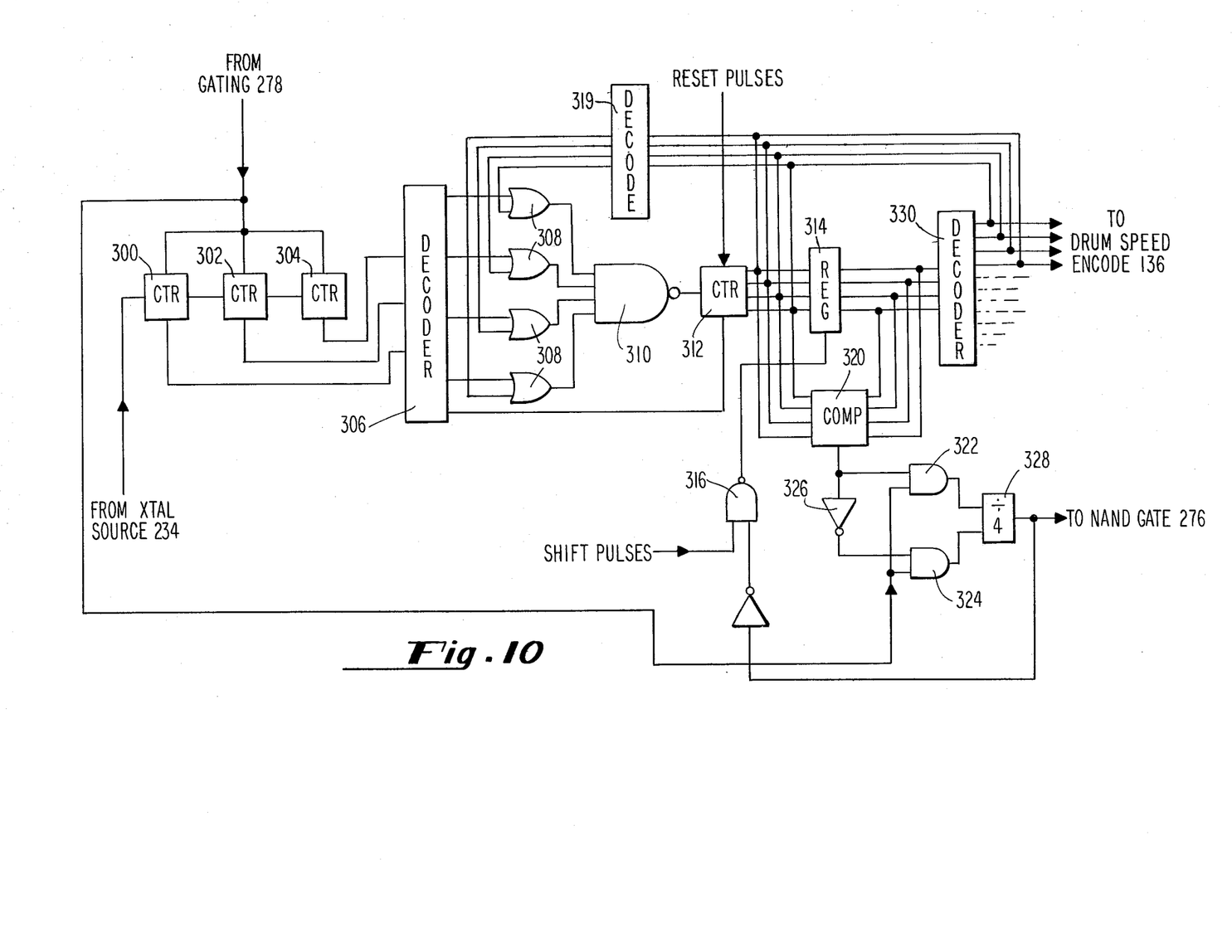
FIG. 10 is a schematic circuit diagram of the drum speed detector shown in block form in FIG. 9.

As shown in FIG. 10, a plurality of counters 300, 302 and 304 are advanced by clock pulses from the crystal source 234 until being reset by the output from the gating circuit 278 indicating a valid sync signal transition. Thus the counters are continually advanced so as to generate a count representing the time lapse between sync pulses. The time lapse is segregated into specific periods as decoded by decoder 306 and gate 308. Each of these periods represents a time window which brackets one of the time lapse periods corresponding to a specific drum speed. The count corresponding to this time lapse between sync pulses is applied to a decoder 306 having outputs applied to OR gates 308. As the OR gates 308 are sequentially enabled by the output of the decoder 306 and a decoder 318, pulses are applied to a NAND gate 310 having an output connected to a counter 312. The counter 312 is reset in response to reset pulses which are generated at each black/white transition representing the onset of the following sync pulse. The output from the counter 312 is loaded into register 314 in response to shift pulses and the output of counter 328 is applied to a NAND gate 316 where the shift pulses follow closely after the strobe pulses.

The output of the counter 312 is coupled to a decoder 319 which applies input signals to the OR gates 308 so as to sequentially enable the OR gates 308. The output from the decoder 330 is applied to the drum speed encoder 136 so as to set the drum speed at the receiver to correspond with the drum speed at the transmitter.

In order to be sure that a constant drum speed is being detected, the input to and the output from the register 314 is applied to a comparator 320. The output of the comparator 320 is coupled directly to an AND gate 322 and indirectly to an AND gate 324 through an inverter 326. The divide-by-four counter 328 will be advanced one count at the valid transition of one edge of the sync pulse provided the comparator 320 detects a new time lapse between sync pulses which is substantially equal to the previous time lapse detected. After four consecutive counts, the counter latch, and the output from the decoder 330 is applied to the drum speed decoder 136 and the head speed encoder 152 of FIG. 2.

The handshake latch and enable circuit 78 and 80 as shown in FIG. 1 and the handshake enable circuit 180 as shown in FIG. 2 have not been described in detail. However, these circuits and their function are described in substantial detail in the aforesaid copending application Ser. No. 886,135 filed Mar. 13, 1978 which is incorporated herein by reference. Similarly, the ready to receive enable circuit 176 associated with the tone generator 172 as shown in FIG. 2 and the ready to receive tone detector 76 as shown in FIG. 1 are described in detail in the aforesaid copending application Ser. No. 886,136 filed Mar. 13, 1978 which is incorporated herein by reference.

It will be understood that various and other transmission modes may be signaled utilizing the signalling techniques disclosed herein. For example, it is possible to utilize the pulse duration rather than time lapse between pulses to signal scanning rates. It is also possible to utilize pulse duration to signal other information unrelated to scanning rates, for example, the synchronizing of the facsimile transmitter to AC line or a crystal source as disclosed in parent application Ser. No. 617,104 filed Sept. 26, 1975 which is incorporated herein by reference.

It will also be understood that synchronizing pulses may take on different forms and durations. For example, the synchronizing pulse may be substantially larger than the 27 ms. maximum described in the foregoing specification. Moreover, the modulated signals representing the synchronizing pulses need not be frequency modulated, e.g., amplitude modulation could be utilized.

Although a particular embodiment of the invention has been shown and described in detail, it will be understood that various modifications may be made without departing from the true spirit and scope of the invention as set forth in the appended claims.

What is claimed is:

1. A facsimile unit for transmitting signals representing dark-light variations in a document to a remote location:
    sensor means for sensing dark-light variations in a document in two substantially orthogonal directions;
    scanning means for scanning said sensor means relative to the document;
    sync generator means coupled to said scanning means for generating synchronizing signals comprising a series of pulses representing the predetermined relative position between said scanning means and said sensor means;
    modulator means coupled to said sensor means and said sync generator means for generating modulated transmission signals representing dark-light variations in the document and said synchronizing signals; and
    mode signaling means associated with said sync generator means for selecting and controlling the time lapse between pulses in said synchronizing signals in response to the selection of a transmission mode during an initial synchronizing period prior to transmission of signals representing dark-light variations for signaling the scanning rates in both of said orthogonal directions.

2. The facsimile unit of claim 1 wherein said scanning means traverses from one edge on a document to an opposing edge thereof on said document a plurality of times while scanning in said one of said orthogonal directions and traverses from another edge of said document to a opposing edge thereof on said document only once while scanning in the other of said orthogonal directions.

3. A facsmile unit for transmitting signals representing dark-light variations in a document to a remote location:
    sensor means for sensing dark-light variations in a document;
    scanning means for scanning said detector means relative to the document;
    sync generator means coupled to said scanning means for generating synchronizing signals comprising a series of pulses representing the predetermined relative position between said scanning means and said sensor means;
    modulator means coupled to said sensor means and said sync generator means for generating modulated transmission signals representing dark-light variations in the document and said synchronizing signals; and
    mode signaling means for signaling video signal transmission modes prior to entering said modes, said signaling means associated with said sync generator means for selecting and controlling the duration of said pulses to signal at least one video signal transmission mode corresponding to one duration and a plurality of modes corresponding to another duration, said mode signaling means also selecting and controlling the time lapse between pulses to signal each of said plurality of video signal transmission modes.

4. The facsimile unit of claim 3 wherein the selection and control of said time lapse between and the duration of said pulses signals the scanning rate characteristic of the selected mode.

5. The facsimile unit of claim 4 wherein said scanning means scans said sensor means relative to the document in two substantially orthogonal directions, said time lapse signaling the scanning rate in one of said directions.

6. The facsimile unit of claim 5 wherein said scanning means traverses from one edge on a document to an opposing edge thereof on said document a plurality of times while scanning in said one of said orthogonal directions and traverses from another edge of said document to an opposing edge thereof on said document only once while scanning in the other of said orthogonal directions.

7. The facsimile unit of claim 5 wherein said time lapse also signals the scanning rate in the other of said directions.

8. The facsimile unit of claim 7 wherein said scanning means traverses from one edge on a document to an opposing edge on said document a plurality of times while scanning in said one of said orthogonal directions and traverses from another edge of said document to an opposing edge thereof of said document only once while scanning in the other of said orthogonal directions.

9. The facsimile unit of claim 3 wherein said modulation means generator frequency modulated signals representing sync pulses and the time lapse therebetween.

10. The fascimile unit of claim 9 wherein said modulated signals represent a variable scanning rate in response to the density of dark regions on said document.

11. The facsimile unit of claim 9 wherein said modulated signals represent the bandwidth of frequency modulated transmission signals representing dark-light variations on said modes.

12. The facsimile unit of claim 11 wherein the modulated signals represent the type of modulation being utilized in transmitting dark-light variations.

13. A facsimile unit for reproducing dark-light variations in a copy representing a facsimile of a remotely located document:
writing means for producing dark-light variations on a copy medium;
scanning means for scanning said writing means relative to the copy medium;
detector means coupled to said writing means for demodulating received signals representing dark-light variations in said document, said detector means also demodulating said received signals representing synchronizing signals including synchronizing pulses prior to demodulating said received signals representing dark-light variations, said detector means further for determining both the time lapse between and duration of said pulses for indicating one of a plurality of video transmission modes for said dark-light variations.

14. The facsimile unit of claim 13 including scanning control means coupled to said detector means and said scanning means for controlling the scanning rate of said scanning means in response to said received signals.

15. The facsimile unit of claim 14 wherein said detector means detects received signals representing sync pulses and the time lapse therebetween and said scanning control means is responsive to said received signals to establish a variable scanning rate responsive to the density of dark regions as determined by said detector means.

16. The facsimile unit of claim 13 wherein said scanning means scans said copy medium in two substantially orthogonal directions, said scanning control means controlling the scanning rate in at least one of said directions.

17. The facsimile unit of claim 16 wherein said scanning control means selectively controls said scanning rate in each of said directions.

18. The facsimile unit of claim 13 wherein said detector means detects received signals representing sync pulses and the time lapse therebetween and detector control means prepares the detector means for the type of demodulation to be utilized by the detector means in demodulating received signals representing dark-light variations.

19. The facsimile unit of claim 13 wherein said detector means detects received signals representing sync pulses and the time lapse therebetween and detector control means selects and prepares the detector means for demodulating received signals representing dark-light variations in a predetermined bandwidth.

20. A facsimile unit for transmitting signals representing dark-light variations in a document to a remote location:
sensor means for sensing dark-light variations in a document;
scanning means for scanning said sensor means relative to the document;
sync generator means coupled to said scanning means for generating synchronizing signals comprising a series of pulses representing the predetermined relative position between said scanning means and said sensor means;
modulator means coupled to said sensor means and said sync generator means for generating modulated transmission signals representing dark-light variations in the document and said synchronizing signals; and
mode signalling means associated with said sync generator means for selecting and controlling the time lapse between pulses in said synchronizing signals in response to the selection of one of a plurality of transmission modes during an initial synchronizing period prior to transmission of video signals representing dark-light variations during each of said transmission modes, said mode signaling means further comprising means for selecting and controlling the duration of said pulses in response to the selection of a transmission mode during said initial synchronizing period so as to signal the selected mode.

21. The facsimile unit of claim 20 wherein the selection and control of said time lapse and said duration each signaling the scanning rate characteristic of the selected mode.

22. The facsimile unit of claim 21 wherein said scanning means scans said sensor means relative to the document in two substantially orthogonal directions, said time lapse and said duration each signaling the scanning rate in one of said directions.

23. The facsimile unit of claim 22 wherein said scanning means traverses from one edge on a document to an opposing edge thereof on said document a plurality of times while scanning in said one of said orthogonal directions and traverses from another edge of said document to an opposing edge thereof on said document only once while scanning in the other of said orthogonal directions.

24. The facsimile unit of claim 22 wherein said time lapse and said duration also signal the scanning rate in the other of said directions.

25. The facsimile unit of claim 24 wherein said scanning means traverses from one edge on a document to an opposing edge thereof on said document a plurality of times while scanning in said one of said orthogonal direction and traverses from another edge of said document to an opposing edge thereof on said document only once while scanning in the other of said orthogonal direction.

26. The facsimile unit of claim 20 wherein said selected duration is short relative to said selected time lapse.

27. The facsimile unit of claim 20 wherein said modulator means includes means for generating modulated signals representing said synchronizing signals, said mode signaling means including means for selecting and controlling the modulation of said modulated signals.

28. A facsimile unit for transmitting signals representing dark-light variations in a document to a remote location:
sensor means for sensing dark-light variations in a document;
scanning means for scanning said sensor means relative to the document;
sync generator means coupled to said scanning means for generating synchronizing signals comprising a series of pulses representing the predetermined relative position between said scanning means and said sensor means;
modulator means coupled to said sensor means and said sync generator means for generating modulated transmission signals representing dark-light variations in the document and said synchronizing signals; and
mode signaling means associated with said sync generator means and said modulator means for transmitting modulated synchronizing pulses representing a variable scanning rate varied in response to the density of dark regions on said document.

29. The facsimile unit of claim 28 wherein the variable scanning rate is increased in response to a low density of dark regions and decreased in response to a high density of dark regions.

30. The facsimile unit of claim 29 wherein the frequency of said modulated signals is selected and controlled during said pulses.

31. The facsimile unit of claim 29 wherein the frequency of said modulated signals is selected and controlled during the time lapse between said pulses.

32. The facsimile unit of claim 29 wherein the frequency of said modulated signals is selected and controlled during and in the time lapse between said pulses.

33. The facsimile unit of claim 28 wherein said scanning means scans in two substantially orthogonal directions and the frequency of said modulated pulses is selected and controlled to signal a variable scanning rate in both of said directions in response to the density of dark regions on said document.

34. The facsimile unit of claim 33 wherein the variable scanning rate is increased in response to a low density of dark regions and decreased in response to a high density of dark regions.

35. The facsimile unit of claim 34 wherein the frequency of said modulated pulses is selected and controlled during said pulses.

36. The facsimile unit of claim 34 wherein the frequency of said modulated pulses is selected and controlled in the time lapse between said pulses.

37. The facsimile unit of claim 34 wherein the frequency of said modulated pulses is selected and controlled during and in the time lapse between said pulses.

* * * * *